(12) United States Patent
Xue et al.

(10) Patent No.: US 10,830,570 B2
(45) Date of Patent: Nov. 10, 2020

(54) STEERING KNUCKLE DEFORMATION GAUGE

(71) Applicant: CITIC DICASTAL CO., LTD, Qinhuangdao, Hebei (CN)

(72) Inventors: Bowen Xue, Hebei (CN); Qiu Ren, Hebei (CN); Xiaoqin Xu, Hebei (CN); Jiandong Guo, Hebei (CN)

(73) Assignee: CITIC Discastal Co., Ltd., Qinhuangdao (CN)

( * ) Notice: Subject to any disclaimer, the term of this patent is extended or adjusted under 35 U.S.C. 154(b) by 187 days.

(21) Appl. No.: 16/247,033

(22) Filed: Jan. 14, 2019

(65) Prior Publication Data

US 2019/0323815 A1    Oct. 24, 2019

(30) Foreign Application Priority Data

Apr. 19, 2018   (CN) .......................... 2018 1 0352087

(51) Int. Cl.
*G01B 5/30*    (2006.01)
*G01B 5/00*    (2006.01)

(52) U.S. Cl.
CPC ............. *G01B 5/30* (2013.01); *G01B 5/0004* (2013.01)

(58) Field of Classification Search
CPC ...................................................... G01B 5/30
USPC ......................................................... 33/600
See application file for complete search history.

(56) References Cited

U.S. PATENT DOCUMENTS

| 5,105,546 A * | 4/1992 | Weise ................... G01B 7/315 33/203.12 |
| 2003/0159303 A1* | 8/2003 | Crawford ................ B62D 1/10 33/645 |
| 2006/0168827 A1* | 8/2006 | Roethlisberger ....... G01B 21/26 33/203.18 |
| 2016/0046337 A1* | 2/2016 | Niessen ............... G01B 5/0025 29/466 |
| 2016/0200356 A1* | 7/2016 | Xue ....................... B23B 35/00 29/428 |
| 2016/0354885 A1* | 12/2016 | Xue ........................ B23B 41/00 |
| 2019/0195609 A1* | 6/2019 | Xue ..................... G01B 5/0025 |
| 2019/0285395 A1* | 9/2019 | Xue ......................... G01B 5/14 |
| 2019/0323815 A1* | 10/2019 | Xue .................... G01M 17/007 |
| 2020/0141725 A1* | 5/2020 | Liu ........................ G01B 5/201 |

FOREIGN PATENT DOCUMENTS

CN    105890499 A    8/2016
CN    106197191 A    12/2016

* cited by examiner

*Primary Examiner* — George B Bennett
(74) *Attorney, Agent, or Firm* — IPro, PLLC; Qian Gu

(57) ABSTRACT

The present invention includes a steering knuckle deformation gauge. A center hole of a workpiece cooperates with a center column to realize initial positioning of the workpiece. Two tapered holes of the workpiece cooperate with the spherical top ends of a first guide pillar and a second guide pillar respectively, and three support points on the workpiece are respectively in contact with three support columns. The workpiece is completely positioned, and the workpiece is clamped by three toggle clamps. Steps of a measuring sleeve are in close fit with the end face of a sliding sleeve, and the small end of a measuring column is in contact with a measured point of the workpiece.

1 Claim, 3 Drawing Sheets

STEERING KNUCKLE DEFORMATION GAUGE

CROSS REFERENCE TO RELATED APPLICATION

This application claims priority to Chinese Patent Application No. 201810352087.7 entitled STEERING KNUCKLE DEFORMATION GAUGE filed on Apr. 19, 2018, which is incorporated herein by reference for all purposes.

FIELD OF THE INVENTION

The present invention relates to a gauge, specifically to a gauge for detecting the deformation of a steering knuckle blank.

BACKGROUND OF THE INVENTION

During the casting and heat treatment of an aluminum alloy steering knuckle, its head is often deformed seriously under the gravity due to its structural characteristics. Whether the deformed workpiece is qualified needs to be quickly identified in the production process. The conventional three-coordinate measurement cannot meet the detection efficiency at all, so a simple, easy-to-operate and high-precision gauge is needed to quickly identify the deformation.

SUMMARY OF THE INVENTION

The objective of the present invention is to provide a steering knuckle deformation gauge, which can be used for measuring the deformation of a measured position of a workpiece.

In order to achieve the above objective, the technical solution of the present invention is:

A steering knuckle deformation gauge, consisting of feet (1), a bottom plate (2), a support column I (3), a pad I (4), a toggle clamp I (5), a pad II (6), a toggle clamp II (7), a center column (8), a toggle clamp III (9), a pad III (10), a support column II (11), a spring I (12), a guide sleeve I (13), a guide pillar I (14), a support column III (15), a guide sleeve II (16), a guide pillar II (17), a spring II (18), a positioning seat (19), a sliding sleeve (20), a measuring column (21), a stop screw (22) and a measuring sleeve (23), the four feet (1) are fixed on four corners below the bottom plate (2). The support column I (3), the support column II (11) and the support column III (15) are fixed at different positions above the bottom plate (2) and correspond to three support points on a workpiece respectively. The center column (8) is fixed above the bottom plate (2), and cooperates with a center hole of the workpiece. The toggle clamp I (5) is fixed above the bottom plate (2) via the pad I (4), the toggle clamp II (7) is fixed above the bottom plate (2) via the pad II (6), and the toggle clamp III (9) is fixed above the bottom plate (2) via the pad III (10). The guide sleeve I (13) and the guide sleeve II (16) are fixed at different positions above the bottom plate (2), and the center lines thereof respectively correspond to the center lines of two tapered holes in the workpiece. The guide pillar I (14) cooperates with the guide sleeve I (13), and the spring I (12) is mounted inside the guide sleeve I (13) and placed under the guide pillar I (14), while the guide pillar II (17) cooperates with the guide sleeve II (16), and the spring II (18) is mounted inside the guide sleeve II (16) and placed under the guide pillar II (17). The positioning seat (19) is fixed above the bottom plate (2). The sliding sleeve (20) is fixed in a hole above the positioning seat (19), and the height thereof corresponds to the height of a measured point of the workpiece. The measuring sleeve (23) is stepped, the outer side thereof fits an inner hole of the sliding sleeve (20), and the fit clearance is less than 0.01 mm.

A touch gauge comprises the measuring column (21), the stop screw (22) and the measuring sleeve (23). The measuring column (21) fits an inner hole of the measuring sleeve (23), and the fit clearance is less than 0.01 mm. The stop screw (22) is fixed outside the measuring sleeve (23), and the top end thereof corresponds to a limiting slot of the measuring column (21).

The edges of the top end faces of the measuring column (21) and the measuring sleeve (23) are sharp. The top end of the measuring sleeve (23) is stepped, and the height of the steps is the value of allowable deformation of the measured workpiece.

The top ends of the guide pillar I (14) and the guide pillar II (17) are spherical and cooperate with the two tapered holes in the workpiece.

In actual use, the center hole of the workpiece cooperates with the center column to realize the initial positioning of the workpiece. The two tapered holes of the workpiece cooperate with the spherical top ends of the guide pillar I and the guide pillar II respectively, and the three support points on the workpiece are respectively in contact with the support column I, the support column II and the support column III. The workpiece is completely positioned, and the workpiece is clamped by the toggle clamp I, the toggle clamp II and the toggle clamp III. The steps of the measuring sleeve are in close fit with the end face of the sliding sleeve, the small end of the measuring column is in contact with the measured point of the workpiece, whether the top end face of the measuring column is between the step faces of the top end of the measuring sleeve is observed, and whether the deformation of the workpiece is within an acceptable range can be judged.

The steering knuckle deformation gauge can be used for measuring the deformation of the measured position of the workpiece, and at the same time, has the characteristics of simple structure, low manufacturing cost, advanced technology, strong versatility and high safety and stability.

In which, 1—foot, 2—bottom plate, 3—support column I, 4—pad I, 5—toggle clamp I, 6—pad II, 7—toggle clamp II, 8—center column, 9—toggle clamp III, 10—pad III, 11—support column II, 12—spring I, 13—guide sleeve I, 14—guide pillar I, 15—support column III, 16—guide sleeve II, 17—guide pillar II, 18—spring II, 19—positioning seat, 20—sliding sleeve, 21—measuring column, 22—stop screw, and 23—measuring sleeve.

DETAILED DESCRIPTION OF EMBODIMENTS

The details and working conditions of the specific device according to the present invention will be described below in combination with the drawings.

Figure 1:
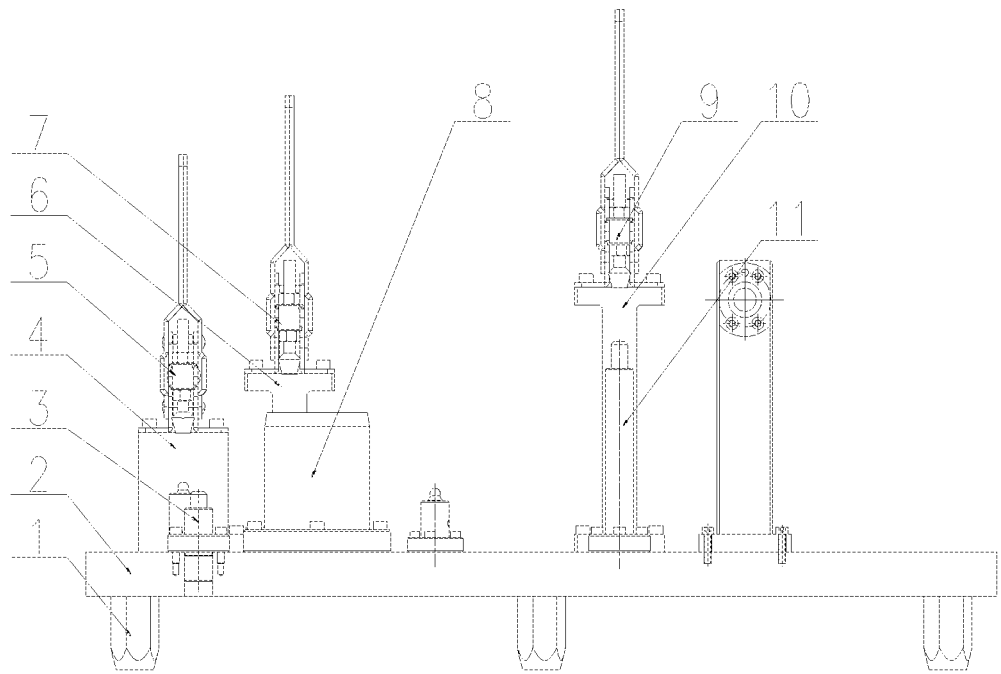
FIG. 1 is a front view of a steering knuckle deformation gauge according to the present invention.
Figure 2:
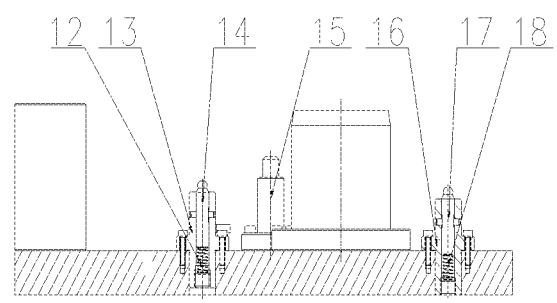
FIG. 2 is a partial left view of the steering knuckle deformation gauge according to the present invention.
Figure 3:
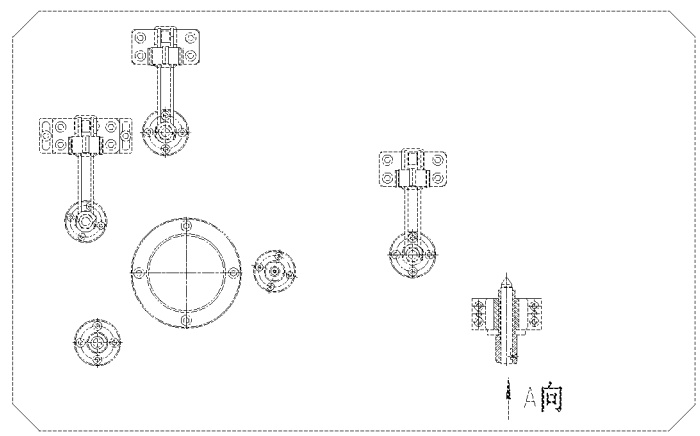
FIG. 3 is a top view of the steering knuckle deformation gauge according to the present invention.
Figure 4:
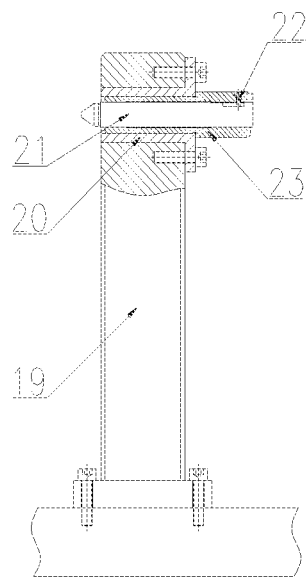
FIG. 4 is a partial view of the steering knuckle deformation gauge in a direction A according to the present invention.
Figure 5:
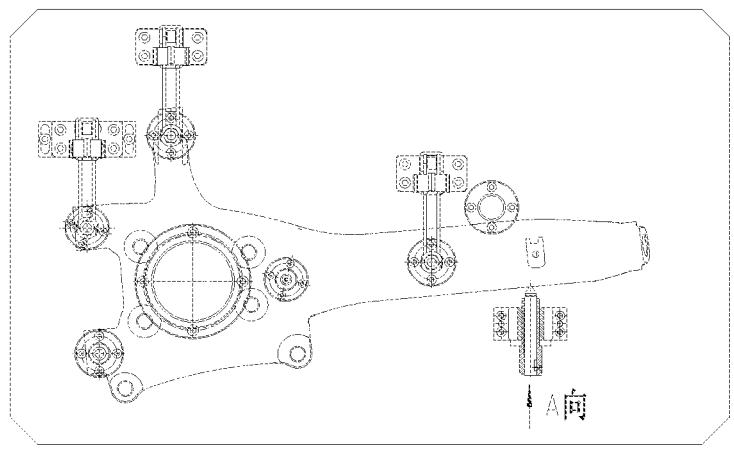
FIG. 5 is a top view when the steering knuckle deformation gauge detects a workpiece according to the present invention.

As shown in FIGS. 1-5, a steering knuckle deformation gauge, consisting of feet (1), a bottom plate (2), a support column I (3), a pad I (4), a toggle clamp I (5), a pad II (6), a toggle clamp II (7), a center column (8), a toggle clamp III (9), a pad III (10), a support column II (11), a spring I (12), a guide sleeve I (13), a guide pillar I (14), a support column III (15), a guide sleeve II (16), a guide pillar II (17), a spring II (18), a positioning seat (19), a sliding sleeve (20), a measuring column (21), a stop screw (22) and a measuring sleeve (23), the four feet (1) are fixed on four corners below the bottom plate (2). The support column I (3), the support column II (11) and the support column III (15) are fixed at different positions above the bottom plate (2) and correspond to three support points on a workpiece respectively. The center column (8) is fixed above the bottom plate (2), and cooperates with a center hole of the workpiece. The toggle clamp I (5) is fixed above the bottom plate (2) via the pad I (4), the toggle clamp II (7) is fixed above the bottom plate (2) via the pad II (6), and the toggle clamp III (9) is fixed above the bottom plate (2) via the pad III (10). The guide sleeve I (13) and the guide sleeve II (16) are fixed at different positions above the bottom plate (2), and the center lines thereof respectively correspond to the center lines of two tapered holes in the workpiece. The guide pillar I (14) cooperates with the guide sleeve I (13), and the spring I (12) is mounted inside the guide sleeve I (13) and placed under the guide pillar I (14), while the guide pillar II (17) cooperates with the guide sleeve II (16), and the spring II (18) is mounted inside the guide sleeve II (16) and placed under the guide pillar II (17). The positioning seat (19) is fixed above the bottom plate (2). The sliding sleeve (20) is fixed in a hole above the positioning seat (19), and the height thereof corresponds to the height of a measured point of the workpiece. The measuring sleeve (23) is stepped, the outer side thereof fits an inner hole of the sliding sleeve (20), and the fit clearance is less than 0.01 mm.

A touch gauge comprises the measuring column (21), the stop screw (22) and the measuring sleeve (23). The measuring column (21) fits an inner hole of the measuring sleeve (23), and the fit clearance is less than 0.01 mm. The stop screw (22) is fixed outside the measuring sleeve (23), and the top end thereof corresponds to a limiting slot of the measuring column (21).

The edges of the top end faces of the measuring column (21) and the measuring sleeve (23) are sharp. The top end of the measuring sleeve (23) is stepped, and the height of the steps is the value of allowable deformation of the measured workpiece.

The top ends of the guide pillar I (14) and the guide pillar II (17) are spherical and cooperate with the two tapered holes in the workpiece.

The invention claimed is:

1. A steering knuckle deformation gauge, comprising: feet, a bottom plate, a first support column, a first pad, a first toggle clamp, a second pad, a second toggle clamp, a center column, a third toggle clamp, a third pad, a second support column, a first spring, a first guide sleeve, a first guide pillar, a third support column, a second guide sleeve, a second guide pillar, a second spring, a positioning seat, a sliding sleeve, a measuring column, a stop screw and a measuring sleeve, wherein the four feet are fixed on four corners below the bottom plate; the first support column, the second support column and the third support column are fixed at different positions above the bottom plate and correspond to three support points on a workpiece respectively; the center column is fixed above the bottom plate, and cooperates with a center hole of the workpiece; the first toggle clamp is fixed above the bottom plate via the first pad; the second toggle clamp is fixed above the bottom plate via the second pad; the third toggle clamp is fixed above the bottom plate via the third pad; the first guide sleeve and the second guide sleeve are fixed at different positions above the bottom plate, and center lines thereof respectively correspond to center lines of two tapered holes in the workpiece; the first guide pillar cooperates with the first guide sleeve, and the first spring is mounted inside the first guide sleeve and placed under the first guide pillar; the second guide pillar cooperates with the second guide sleeve, and the second spring is mounted inside the second guide sleeve and placed under the second guide pillar; the positioning seat is fixed above the bottom plate; the sliding sleeve is fixed in a hole above the positioning seat, and a height thereof corresponds to a height of a measured point of the workpiece; the measuring sleeve is stepped, an outer side thereof fits an inner hole of the sliding sleeve, and a fit clearance is less than 0.01 mm;

the measuring column, the stop screw and the measuring sleeve form a touch gauge; the measuring column fits an inner hole of the measuring sleeve, and a fit clearance is less than 0.01 mm; the stop screw is fixed outside the measuring sleeve, and a top end thereof corresponds to a limiting slot of the measuring column; edges of top end faces of the measuring column and the measuring sleeve are sharp; the top end of the measuring sleeve is stepped, and a height of steps is a value of allowable deformation of the measured workpiece; and top ends of the first guide pillar and the second guide pillar are spherical and cooperate with the two tapered holes in the workpiece.

* * * * *